United States Patent
Sallaz et al.

(10) Patent No.: US 11,823,836 B2
(45) Date of Patent: Nov. 21, 2023

(54) LOW DEFECT HIGH CAPACITANCE THIN SOLID ELECTROLYTE CAPACITOR AND METHOD OF FABRICATION THEREOF

(71) Applicants: Murata Manufacturing Co., Ltd., Nagaokakyo (JP); COMMISSARIAT A L'ENERGIE ATOMIQUE ET AUX ENERGIES ALTERNATIVES, Paris (FR)

(72) Inventors: Valentin Sallaz, Cran-Gevrier (FR); Frédéric Voiron, Barraux (FR); Sami Oukassi, Grenoble (FR)

(73) Assignees: MURATA MANUFACTURING CO., LTD., Nagaokakyo (JP); COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 89 days.

(21) Appl. No.: 17/696,345

(22) Filed: Mar. 16, 2022

(65) Prior Publication Data
US 2022/0208480 A1   Jun. 30, 2022

Related U.S. Application Data

(63) Continuation of application No. PCT/EP2020/075234, filed on Sep. 9, 2020.

(30) Foreign Application Priority Data

Sep. 17, 2019   (EP) ..................... 19306116

(51) Int. Cl.
*H01G 11/24* (2013.01)
*H01G 11/56* (2013.01)
(Continued)

(52) U.S. Cl.
CPC ............. *H01G 11/24* (2013.01); *H01G 11/46* (2013.01); *H01G 11/50* (2013.01); *H01G 11/56* (2013.01); *H01G 11/86* (2013.01)

(58) Field of Classification Search
CPC ........ H01G 11/24; H01G 11/46; H01G 11/50; H01G 11/56; H01G 11/86
See application file for complete search history.

(56) References Cited

U.S. PATENT DOCUMENTS

| | | | | |
|---|---|---|---|---|
| 6,627,513 B1 * | 9/2003 | Tsai | ........................ | H01L 22/34 257/E21.651 |
| 7,084,002 B2 * | 8/2006 | Kim | ........................ | H01M 4/48 438/85 |

(Continued)

FOREIGN PATENT DOCUMENTS

| | | |
|---|---|---|
| CN | 107527740 A | 12/2017 |
| EP | 0283239 A1 | 9/1988 |

(Continued)

OTHER PUBLICATIONS

International Search Report issued for PCT/EP2020/075234, dated Dec. 2, 2020.

*Primary Examiner* — Dion R. Ferguson
(74) *Attorney, Agent, or Firm* — ArentFox Schiff LLP (57) ABSTRACT

A method of fabricating a capacitor that includes: forming a three-dimensional structure over a substrate, the three-dimensional structure having a region with elongated pores extending towards the substrate from a top surface of the three-dimensional structure remote from the substrate or elongated columns extending away from the substrate towards the top surface of the three-dimensional structure remote from the substrate; forming a first electrode layer over a surface of the region of the three-dimensional structure, the first electrode conformal to the surface of the region; forming an intermediate layer over the first electrode (Continued)

layer; and forming a second electrode layer over the intermediate layer, the second electrode layer conformal to the intermediate layer, wherein forming the intermediate layer includes: forming a solid-state electrolyte layer partially conformal to the first electrode layer; and forming a dielectric layer conformal to the first electrode layer.

13 Claims, 6 Drawing Sheets

(51) Int. Cl.
*H01G 11/46* (2013.01)
*H01G 11/50* (2013.01)
*H01G 11/86* (2013.01)

(56) References Cited

U.S. PATENT DOCUMENTS

| | | | | |
|---|---|---|---|---|
| 8,912,522 | B2* | 12/2014 | Rubloff | H01L 29/0676 257/14 |
| 9,013,861 | B2* | 4/2015 | Gardner | H01G 11/36 361/523 |
| 9,570,244 | B2* | 2/2017 | Dunn | H01G 11/58 |
| 9,959,983 | B2* | 5/2018 | Gardner | H01M 10/05 |
| 2003/0205483 | A1* | 11/2003 | Birner | C25F 3/12 257/E21.216 |
| 2004/0161640 | A1 | 8/2004 | Salot | |
| 2011/0073827 | A1* | 3/2011 | Rubloff | H01L 29/0676 438/129 |
| 2014/0043729 | A1 | 2/2014 | Hannah | |
| 2014/0183694 | A1* | 7/2014 | Gardner | H01L 28/90 257/532 |
| 2015/0131205 | A1* | 5/2015 | Amaratunga | H01G 11/04 427/80 |
| 2015/0179356 | A1* | 6/2015 | Gardner | H01G 11/38 361/502 |
| 2015/0200058 | A1* | 7/2015 | Rubloff | H01M 6/04 429/163 |
| 2017/0330692 | A1 | 11/2017 | Tochio et al. | |
| 2017/0365419 | A1 | 12/2017 | Demizu et al. | |
| 2022/0208480 | A1* | 6/2022 | Sallaz | H01G 11/86 |

FOREIGN PATENT DOCUMENTS

| | | | | |
|---|---|---|---|---|
| EP | 2562851 | A1 * | 2/2013 | C25D 1/006 |
| EP | 2783374 | A2 | 10/2014 | |
| EP | 3796351 | B1 * | 11/2021 | H01G 11/24 |
| EP | 3992999 | A1 * | 5/2022 | |
| EP | 4102527 | A1 * | 12/2022 | |
| JP | 2021072331 | A * | 5/2021 | |
| WO | 2004061887 | A1 | 7/2004 | |
| WO | WO-2014011294 | A2 * | 1/2014 | H01G 11/36 |
| WO | 2014028104 | A2 | 2/2014 | |
| WO | 2014028104 | A3 | 2/2014 | |

* cited by examiner

LOW DEFECT HIGH CAPACITANCE THIN SOLID ELECTROLYTE CAPACITOR AND METHOD OF FABRICATION THEREOF

CROSS REFERENCE TO RELATED APPLICATIONS

The present application is a continuation of International application No. PCT/EP2020/075234, filed Sep. 9, 2020, which claims priority to European Patent Application No. 19306116.5, filed Sep. 17, 2019, the entire contents of each of which are incorporated herein by reference.

FIELD OF THE INVENTION

The present invention relates to the field of integration and, more particularly, to electronic products, related semiconductor products, and their methods of manufacture.

TECHNICAL BACKGROUND

In the research for high performance on-chip integrated energy storage solutions, increasing the specific surface of the capacitive structure by using a three-dimensional (3D) architecture (e.g., a mesoporous, nanoporous, nanopillar, or nanowire type architecture) has shown to be an excellent approach that significantly increases capacitance density while allowing the reduction of the die surface. For example, the PICS technology developed by Murata Integrated Passive Solutions allows integrating high density capacitive components into a silicon substrate. According to this technology, tens or even hundreds of passive components can be efficiently integrated into a silicon die.

Another approach to increase the capacitance involves decreasing the thickness of the dielectric. This approach however increases drastically in difficulty with conventional dielectrics as the geometry of the 3D architecture is shrunk. An alternative solution proposes using a solid-state electrolyte instead of a conventional dielectric. In this approach, energy is stored via accumulation of mobile charges (e.g., ions such as Li+, Na+, etc.) at the electrolyte/electrode interfaces through electrostatic and/or redox reactions. With the thickness of the electrolyte appropriately configured to prevent a steep capacitance drop with increasing frequency, several orders of magnitude in terms of capacitance value can be gained with this approach due to the fact that a much greater charge density at the two interfaces can be achieved.

Figure 1:
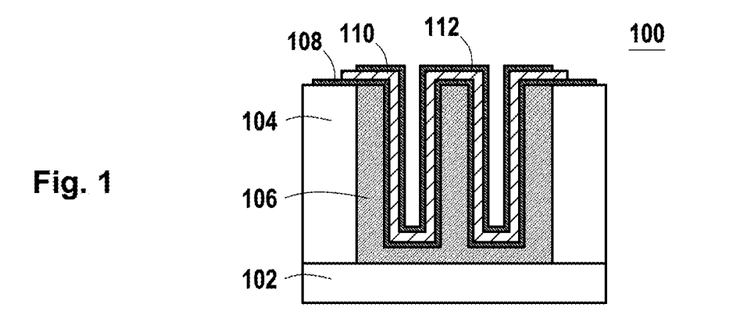
FIG. 1 illustrates a cross-section view of an example 3D solid-state electrolyte capacitor.

FIG. 1 illustrates a cross-section view of an example 3D solid-state electrolyte capacitor 100. As shown in FIG. 1, capacitor 100 includes a 3D structure 104 formed over a substrate 102. The 3D structure 104 includes a porous anodized alumina (PAA) region 106 in which a stacked structure is embedded. The stacked structure includes a first electrode layer 108, a solid-state electrolyte layer 110, and a second electrode layer 112.

To increase the power density and the frequency response of capacitor 100, the thickness of the solid-state electrolyte layer 110 must be sized down to a few nanometers. For this purpose, the deposition of the solid-state electrolyte layer 110 is typically done using Atomic Layer Deposition (ALD) to ensure conformality of the solid-state electrolyte layer 110 to the shape of the PAA region 106.

Figure 2A:
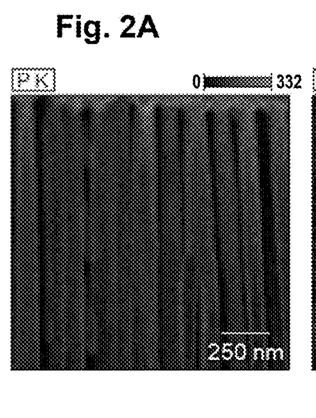
FIGS. 2A to 2C show scanning electron microscopy (SEM) images that illustrate the deposition of solid-state electrolyte into a high aspect ratio 3D structure.
Figure 2B:
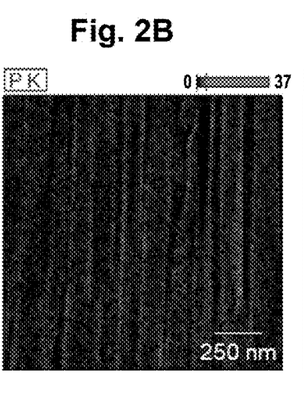
Figure 2C:
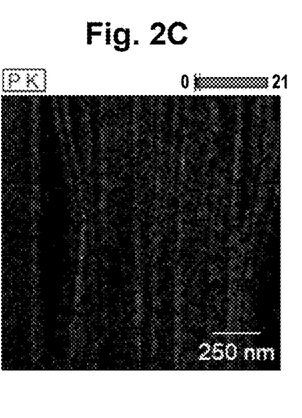

Nevertheless, for a PPA region 106 with a high aspect ratio (e.g., >100), achieving conformality of the solid-state electrolyte layer 110 is a very challenging task due to the fact that exposure to the precursors (used during the ALD of the electrolyte) is typically non-uniform along the pores of the PAA region 106. For example, in experiments, the inventors of the present invention have observed that for a PAA region with an 80 nm pore diameter, conformality issues begin to appear at a pore height beyond approximately 5 microns in the case of lithium phosphorous oxy-nitride (LiPON) ALD deposition. This results in an inhomogeneous deposition of the electrolyte as shown in FIGS. 2A to 2C, which illustrates the deposition of a LiPON layer into a PAA region with a pore height of 12 microns and a pore diameter of 80 nanometers. Specifically, FIGS. 2A to 2C, which are obtained by an Energy Dispersive X-Ray (EDX) analysis of the LiPON layer by scanning the P element all along the pores, shows that the LiPON layer becomes more and more discontinuous as it extends deeper into the PAA pores, as reflected by a decreasing intensity of the P element in the EDX signal (P element intensity decreasing from 322 at the pore surface, to 37 at the middle of the pore, and 21 at the bottom of the pore).

Figure 3A:
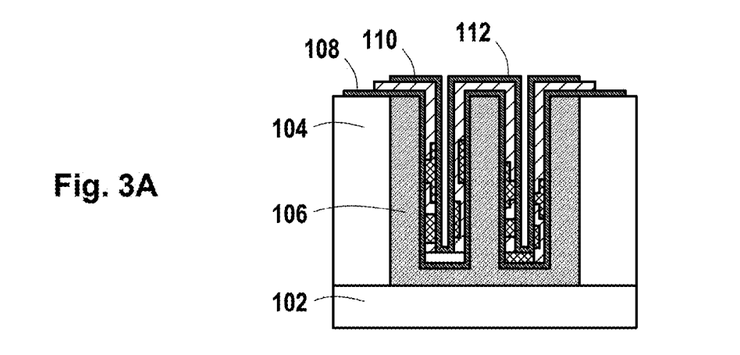
FIGS. 3A to 3C illustrate problems associated with the deposition of a solid-state electrolyte into a high aspect ratio 3D structure.
Figure 3B:
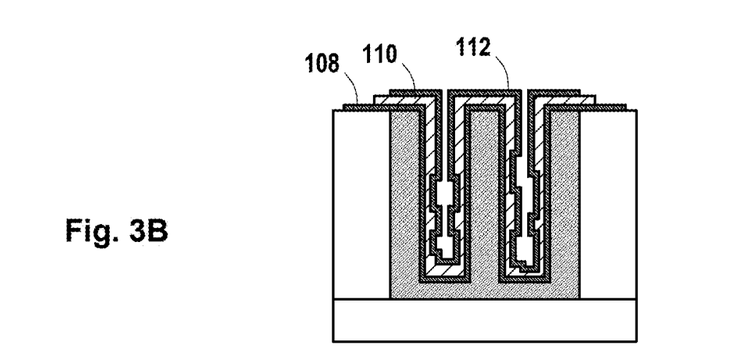
Figure 3C:
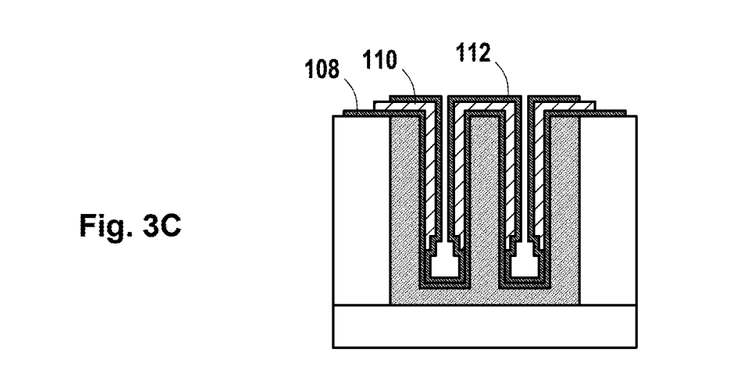

As shown in FIGS. 3A to 3C, the inhomogeneous deposition of the electrolyte layer 110 into the pores of the PAA region 106 typically results in regions of inhomogeneous composition (cross-section in FIG. 3A) (i.e., regions with stoichiometric imbalance) and regions of inhomogeneous thickness (cross-section in FIG. 3B). These regions typically lead to weak spots vulnerable to breakdown and electronic leakage. More severely, the inhomogeneous deposition may create discontinuities in the electrolyte leading to short circuits in the capacitor (cross-section in FIG. 3C).

These defects may be reduced by decreasing the aspect ratio of the 3D structure, increasing the thickness of the electrolyte layer, and/or adjusting the ALD parameters (e.g., performing more ALD cycles, improving the residence time of precursors, or using smaller molecule precursors). However, these solutions come at the cost of significantly increasing the process cost/time and hindering the ultimate goal of maximizing capacitance density.

SUMMARY OF THE INVENTION

The present invention proposes a method of fabricating a low defect, high capacitance thin solid-state electrolyte capacitor. In an embodiment, the method comprises: forming a three-dimensional structure over a substrate, the three-dimensional structure comprising a region having elongated pores extending towards the substrate from a top surface of the three-dimensional structure remote from the substrate or elongated columns extending away from the substrate towards the top surface of the three-dimensional structure remote from the substrate; forming a first electrode layer over a surface of said region of the three-dimensional structure, the first electrode layer conformal to said surface of said region; forming an intermediate layer over the first electrode layer; and forming a second electrode layer over the intermediate layer, the second electrode layer conformal to the intermediate layer, wherein forming the intermediate layer comprises: forming a solid-state electrolyte layer partially conformal to the first electrode layer; and forming a dielectric layer conformal to the first electrode layer.

The formation of the solid-state electrolyte layer in an only partially conformal manner relative to the first electrode layer provides several advantages to the proposed method.

In one aspect, the fabrication time is reduced. With the solid-state electrolyte layer only partially conformal to the first electrode layer, the formation time of the electrolyte (which is typically performed using Atomic Layer Deposition (ALD)) is made shorter. Specifically, shorter precursor deposition and purge periods can be used.

In another aspect, the cost of the fabrication process is reduced as less material is needed. Specifically, the amount of solid-state electrolyte precursor(s) used (an expensive material) is reduced.

In a further aspect, by requiring the solid-state electrolyte layer to be only partially conformal to the first electrode layer, the solid-state electrolyte layer can be made thinner and deposed into three-dimensional structures with even larger aspect ratios. This results in an increased capacitance of the capacitor.

Without limitation, the solid-state electrolyte layer may be made of lithium phosphorous oxy-nitride (LiPON), $Li_3PO_4$, $LiAlF_4$, LiSiPON, $Li_2SiO_3$ or any inorganic lithium ion conductor.

In an embodiment, the thickness of the solid-state electrolyte ranges between 5 and 15 nanometers.

In yet another aspect, by requiring the solid-state electrolyte layer to be only partially conformal to the first electrode layer, a generally used process step of verifying the conformality of the solid-state electrolyte layer can be eliminated. As such, in an embodiment, the fabrication method comprises not verifying the conformality of the solid-state electrolyte layer.

In an embodiment, forming the solid-state electrolyte layer partially conformally to the first electrode layer comprises selecting a target conformality level for the solid-state electrolyte layer and configuring the ALD process for depositing the electrolyte to achieve the selected target conformality level. In an embodiment, the target conformality level is selected based on the geometry of the three-dimensional structure and the electrolyte material.

The formation of the dielectric layer in a conformal manner relative to the first electrode layer mitigates defects that may be caused by allowing the solid-state electrolyte layer to be only partially conformal to the first electrode layer and/or thinner. In one aspect, the dielectric layer reduces defects that would be caused by regions of inhomogeneous composition and regions of inhomogeneous thickness of the electrolyte layer. In another aspect, the dielectric layer mitigates short circuits that would be caused by discontinuities in the electrolyte later.

As used herein, a layer is "conformal" to a (directly or indirectly) underlying layer (or surface) when its conformality is greater than or equal to 80% where it extends along the shape of the underlying layer (or surface), and is "partially conformal" to the underlying layer (or surface) when its conformality is lower than 80% but greater than 50% where it extends along the shape of the underlying layer (or surface). The layer is considered "non-conformal" to the underlying layer (or surface) when its conformality is lower than 50% where it extends along the shape of the underlying layer (or surface). According to embodiments, the layer and the underlying layer (or surface) are shaped in accordance with a 3D structure with elongated pores or elongated columns. the conformality of the layer relative to the underlying layer (or surface) is determined as the ratio between the thickness of the layer measured at the bottom surface of the underlying layer (or surface) (i.e., the surface of the underlying layer or surface at the bottom of the pores or inter-column trenches of the 3D structure) and the thickness of the layer measured at the top surface of the underlying layer (or surface) (i.e., the surface of the underlying layer or surface overlying the top surface of the 3D structure). The thickness of the layer at a given depth (e.g., pore bottom or at the top surface) may be determined by performing measurements at a select number of points of the given depth and averaging the measurements.

In an embodiment, the dielectric layer is made preferably of a paraelectric material. As a paraelectric, the dielectric layer is characterized by a substantially constant permittivity at high frequencies (for example >1 kHz which is the typical cutoff frequency of LiPON) which ensures capacitance stability at the high frequencies. Further, as a paraelectric, the dielectric layer exhibits greater dielectric strength compared to a ferroelectric material, for example, which is advantageous given that one role of the dielectric layer is to prevent breakdown and electronic leakage.

In an embodiment, the dielectric layer is made of alumina, silicon oxide, or hafnium oxide.

Recognizing that deposition of dielectrics into confined structures is today well-controlled (both in terms of thickness control and conformality) even for extreme aspect ratios (e.g., up to 1000), the dielectric layer can be made ultra-thin according to embodiments. In an embodiment, the dielectric layer has a thickness of 5 nanometers or less, which is negligible compared to the combined thickness of the other layers (e.g., on the order of 30 nanometers). As such, the dielectric layer negligibly affects the profile of the structure.

The first/second electrode layer may each include one or more layers of conductive material. In an embodiment, the conductive material is one suitable for ALD deposition. Without limitation, the conductive material may be platinum, ruthenium, molybdenum, cobalt, titanium, titanium nitride, tantalum nitride, $RuO_2$, $Co_3O_4$, $V_2O_5$, $TiO_x$ (x=0.5-2) or $WO_x$ (x=0.5-3).

Depending on the type of storage mechanism, the positions of the solid-state electrolyte layer and the dielectric layer may be interchanged in the capacitor.

In an embodiment, the method comprises: forming the solid-state electrolyte layer over the first electrode layer; and forming the dielectric layer over the solid-state electrolyte layer.

According to this embodiment, the first electrode layer may be formed as a bilayer that includes a conductive layer and an oxide layer suitable for ions diffusion/insertion. The oxide layer may also be selected to be suitable for adsorption occurring at the interface between the oxide layer and the conductive layer. The conductive layer may be made of platinum, ruthenium, molybdenum, cobalt, titanium, titanium nitride, tantalum nitride. The oxide layer may be made of $RuO_2$, $Co_3O_4$, $V_2O_5$, $TiO_x$ (x=0.5-2) or $WO_x$ (x=0.5-3). The oxide layer boosts the presence of ionic charges at the interface between the first electrode layer and the solid-state electrolyte, increasing capacitive density. In an embodiment, the oxide layer may be formed by oxidizing the conductive layer or by ALD.

In an embodiment, forming the intermediate layer comprises forming another solid-state electrolyte layer over the dielectric layer. A boost in capacitive density, particularly at lower frequencies, can be achieved due to the additional solid-state electrolyte layer. According to this embodiment, the first electrode layer and the second electrode layer may each be formed as a bilayer that includes a conductive layer and an oxide layer suitable for ions diffusion/insertion. The oxide layer may also be selected to be suitable for adsorption occurring at the interface between the oxide layer and the conductive layer. The oxide layers enhance faradaic reactions at the electrode/electrolyte interfaces (i.e., reactions in which metal elements, e.g., Li, are oxidized to result in metal ions, e.g., Li+) and result in increased charge density at the interfaces.

In another embodiment, the method comprises: forming the dielectric layer over the first electrode layer; and forming the solid-state electrolyte layer over the dielectric layer.

According to this embodiment, the second electrode layer may be formed as a bilayer that includes a conductive layer and an oxide layer suitable for ions diffusion/insertion. The oxide layer may also be selected to be suitable for adsorption occurring at the interface between the oxide layer and the conductive layer. The conductive layer may be made of platinum, ruthenium, molybdenum, cobalt, titanium, titanium nitride, tantalum nitride. The oxide layer may be made of $RuO_2$, $Co_3O_4$, $V_2O_5$, $TiO_x$ (x=0.5-2) or $WO_x$ (x=0.5-3). The oxide layer boosts the presence of ionic charges at the interface between the second electrode layer and the solid-state electrolyte, increasing capacitive density. In an embodiment, the oxide layer may be formed by oxidizing the conductive layer or by ALD.

As mentioned above, the three-dimensional structure may include elongated pores or elongated columns. Without limitation, the elongated pores may be pores of porous anodized alumina (PAA). The elongated columns may be nanopillars or nanowires.

In another aspect, the invention provides a capacitor, comprising: a substrate; a three-dimensional structure disposed over the substrate, the three-dimensional structure comprising a region having elongated pores extending towards the substrate from a top surface of the three-dimensional structure remote from the substrate or elongated columns extending away from the substrate towards the top surface of the three-dimensional structure remote from the substrate; a first electrode layer disposed over a surface of said region of the three-dimensional structure, conformal to said surface of said region; an intermediate layer disposed over the first electrode layer, conformal to the first electrode layer; and a second electrode layer disposed over the intermediate layer, conformal to the intermediate layer, wherein the intermediate layer comprises: a solid-state electrolyte layer partially conformal to the first electrode layer; and a dielectric layer conformal to the first electrode layer.

BRIEF DESCRIPTION OF THE DRAWINGS

Further features and advantages of the present invention will become apparent from the following description of certain embodiments thereof, given by way of illustration only, not limitation, with reference to the accompanying drawings in which.

DETAILED DESCRIPTION OF EXAMPLE EMBODIMENTS

Embodiments of the present invention address the existing deficiencies of the prior art by proposing a method for fabricating low defect high capacitance thin solid state-electrolyte capacitors.

The inventors of the present invention recognized that state of the art deposition techniques, such as Atomic Layer Deposition (ALD), have conformality deficiencies when used to deposit thin (e.g., less than 30 nanometers) solid-state electrolyte materials into confined structures, such as high aspect ratio (e.g. aspect ratio >100) three-dimensional (3D) structures. These deficiencies, as described above, could result in electronic leakage, breakdown, and/or short circuits in the structure.

While the inventors appreciated that these deficiencies could be reduced by adjusting the parameters of the deposition process (e.g., increasing exposure time and/or the number of cycles in the process, adjusting precursor/electrolyte type), by decreasing the aspect ratio of the 3D structure, and/or by increasing the target thickness of the electrolyte, these solutions came at the cost of significantly increasing the process cost/time and hindering the ultimate goal of maximizing capacitance density.

Instead, recognizing that the deposition of dielectric material is nowadays highly perfected (both in terms of thickness control and conformality) even for extreme aspect ratios (e.g., 1000), the inventors propose to interpose an ultra-thin dielectric layer (e.g., less than 5 nanometers) with the electrolyte layer between the electrodes of the capacitor. As further described below, this solution efficiently resolves the problems described above at a minimal process cost/complication without impacting the performance of the resulting capacitor.

In accordance with this solution, the present invention proposes a method of fabricating a solid-state electrolyte capacitor illustrated in FIGS. 4A-4F according to an embodiment.

Figure 4A:
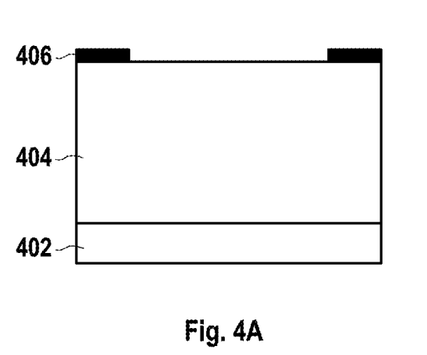
FIGS. 4A-4F illustrates a process of fabricating a 3D solid-state electrolyte capacitor according to an embodiment.
Figure 4B:
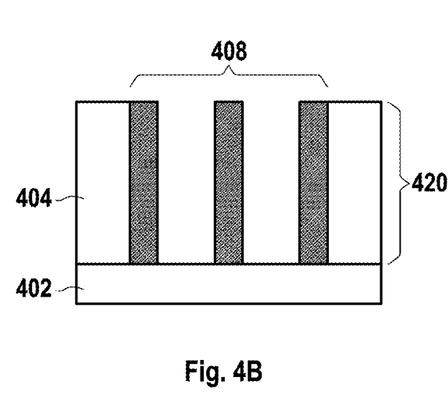

As shown in FIGS. 4A and 4B, the proposed method begins by forming a three-dimensional structure 420 over a substrate 402. The three-dimensional structure comprises a region 408 having elongated pores extending towards the substrate 402 from a top surface 418 of the three-dimensional structure 420 remote from the substrate 402. Alternatively or additionally, the region 408 may comprise elongated columns extending away from the substrate 402 towards the top surface 418 of the three-dimensional structure 420 remote from the substrate 402. Without limitation, the elongated pores may be pores of porous anodized alumina (PAA). The elongated columns may be nanopillars or nanowires.

For the purpose of illustration, and without limitation, the formation of the three-dimensional structure 420 to include elongated pores is shown in FIGS. 4A and 4B.

As shown in FIG. 4A, this includes forming a metal layer 404 above the substrate 402, and depositing a hard mask layer 406 on the metal layer 404. The metal layer 404 may be made of aluminium, though other metals such as titanium or tungsten may also be used. Preferably, the metal used for the metal layer 404 is a metal that anodizes to provide a well-organized porous region. Where it is open, the hard mask layer 406 defines a section within the metal layer 404 where anodization of the metal layer 404 is desired.

Next, as shown in FIG. 4B, the section of the metal layer 404 defined by the hard mask layer 406 is anodized to form the region 408 comprising an anodic oxide layer having pores. In an embodiment, the anodization of metal layer 404 includes a first anodization step, an etching step, and a second anodization step. The first anodization step forms an anodic oxide layer having shallow pores on top of the metal layer 404. The formed anodic oxide layer is then etched resulting in the top surface of metal layer 404 developing a texture that defines the eventual pore locations. The second anodization step completes the anodization of the metal layer 404 to form the pores as shown in FIG. 4B.

Figure 4C:
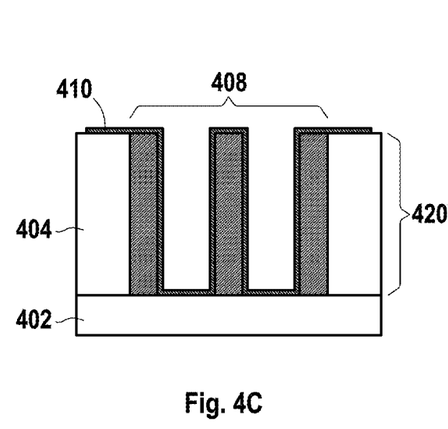

Subsequently, as shown in FIG. 4C, the proposed method includes forming a first electrode layer 410 over a surface of the region 408 of the three-dimensional structure 420, conformal to the surface of the region 408.

As used herein, a layer is "conformal" to a (directly or indirectly) underlying layer (or surface) when its conformality is greater than or equal to 80% where it extends along the shape of the underlying layer (or surface), and is "partially conformal" to the underlying layer (or surface) when its conformality is lower than 80% but greater than 50% where it extends along the shape of the underlying layer (or surface). The layer is considered "non-conformal" to the underlying layer (or surface) when its conformality is lower than 50% where it extends along the shape of the underlying layer (or surface). According to embodiments, the layer and the underlying layer (or surface) are shaped in accordance with a 3D structure with elongated pores or elongated columns. the conformality of the layer relative to the underlying layer (or surface) is determined as the ratio between the thickness of the layer measured at the bottom surface of the underlying layer (or surface) (i.e., the surface of the underlying layer or surface at the bottom of the pores or inter-column trenches of the 3D structure) and the thickness of the layer measured at the top surface of the underlying layer (or surface) (i.e., the surface of the underlying layer or surface overlying the top surface of the 3D structure). The thickness of the layer at a given depth (e.g., pore bottom or at the top surface) may be determined by performing measurements at a select number of points of the given depth and averaging the measurements.

The first electrode layer 410 may include one or more layers of conductive material. In an embodiment, the conductive material is one suitable for ALD deposition. Without limitation, the conductive material may be platinum, ruthenium, molybdenum, cobalt, titanium, titanium nitride, tantalum nitride, $RuO_2$, $Co_3O_4$, $V_2O_5$, $TiO_x$ (x=0.5-2) or $WO_x$ (x=0.5-3). To achieve the required conformality level, ALD with increased exposure time may be used.

Figure 4D:
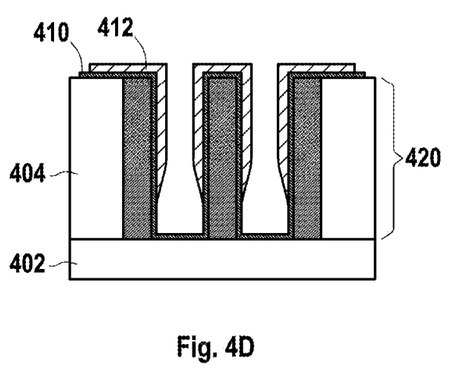
Figure 4E:
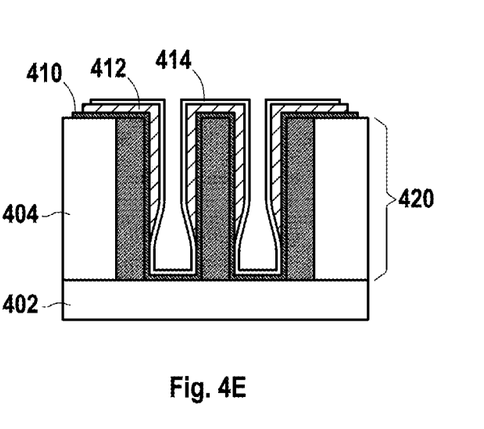

Next, an intermediate layer is formed over the first electrode layer 410. In one embodiment, as shown in FIGS. 4D and 4E, this includes forming a solid-state electrolyte layer 412 partially conformal to the first electrode layer 410; and then forming a dielectric layer 414, over the solid-state electrolyte layer 412, conformal to the first electrode layer 410.

In an embodiment, the deposition of the solid-state electrolyte layer 412 is done using an ALD process pre-configured to achieve a target conformality level of the solid-state electrolyte layer 412 relative to the first electrode layer 410. The target conformality level of the solid-state electrolyte 412 may be selected based on the geometry of the 3D structure (e.g., aspect ratio, pore/column height, pore/column diameter) and the electrolyte material used. For example, for a nanoporous 3D structure with an aspect ratio of 100, a pore height of 8 microns, and a pore diameter of 80 nanometers, the target conformality of a solid-state electrolyte made of LiPON may be selected between 0 and 80%.

As would be understood by a person of skilled in the art based on the teachings herein, an ALD process includes various parameters that impact its outcome. While some of these parameters may be more difficult to adjust (e.g., equipment, substrate), others may be readily varied to impact the deposition outcome. According to embodiments, the ALD process for the deposition of the solid-state electrolyte layer 412 is designed a priori to achieve a selected target conformality level. This includes selecting one or more parameters, including the deposition technique (surface controlled versus controlled), the number of ALD cycles (each cycle consisting of a precursor dosing half-cycle, an exposure step, a purge step, a co-reactant dosing half-cycle, an exposure step, and a purge step), the dosage levels of the precursor and co-reactant in each ALD cycle, the lengths of the precursor/co-reactant half-cycles in each ALD cycle, the lengths of the purge steps in each ALD cycle, etc. Using a simulation tool or experimentally, the outcome of a designed ALD process in a particular 3D structure can be verified. Particularly, the conformality level of the deposited solid-state electrolyte can be measured to verify whether it meets the selected target conformality level.

In an embodiment, because the selected target conformality level of the solid-state electrolyte layer 412 requires it to be only partially conformal to the first electrode layer 410, the conformality of the solid-state electrolyte layer 412 (i.e., whether the layer is conformal) is not verified during fabrication. A generally used process step of verifying the conformality of the solid-state electrolyte layer during the fabrication of a solid-state electrolyte capacitor can thus be eliminated.

Without limitation, the solid-state electrolyte layer may be made of lithium phosphorous oxy-nitride (LiPON), $Li_3PO_4$, $LiAlF_4$, LiSiPON, $Li_2SiO_3$ or any inorganic lithium ion conductor.

Figure 5:
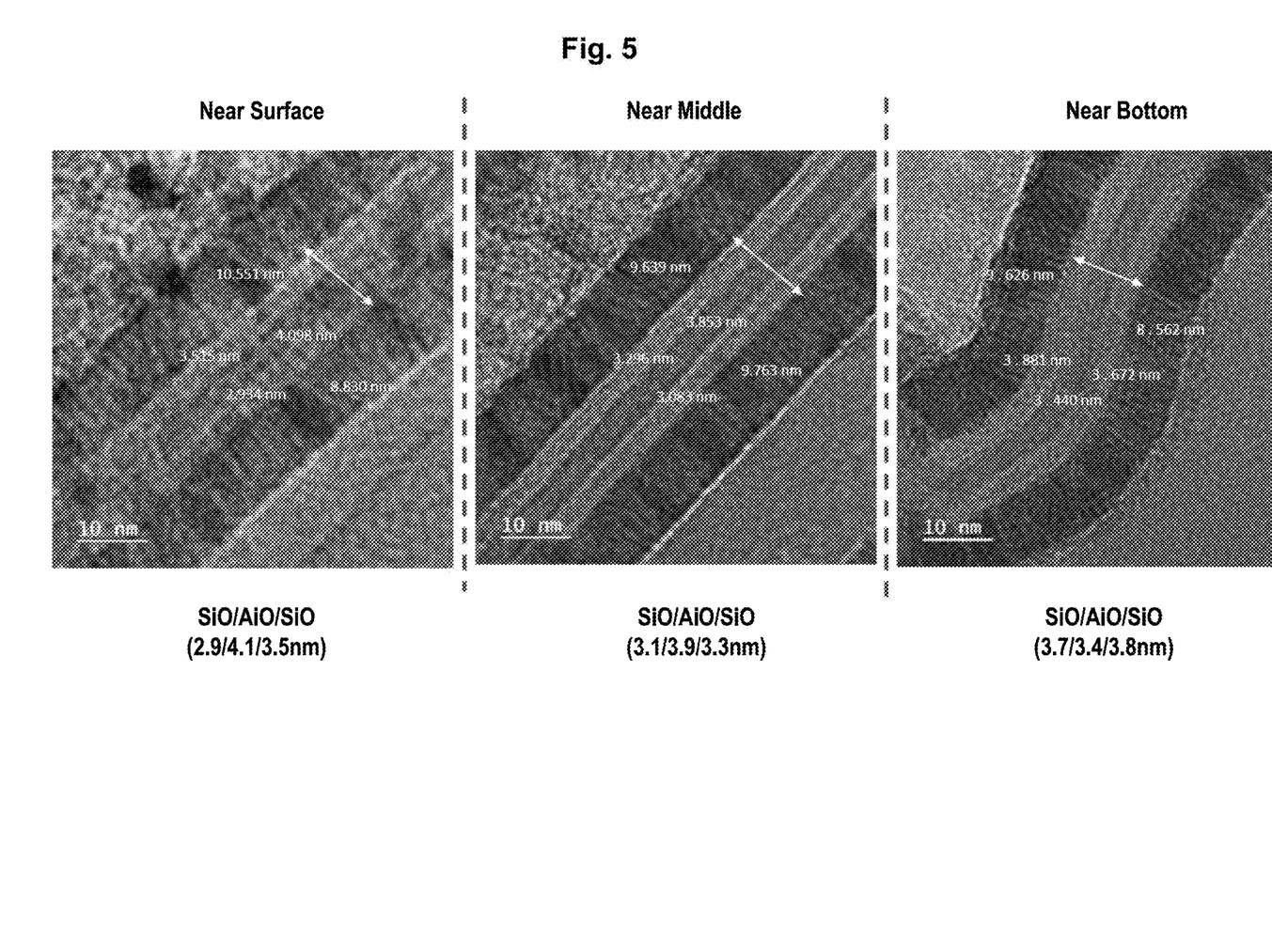
FIG. 5 shows transmission electron microscopy (TEM) images that illustrate the deposition of a dielectric layer into a high aspect ratio 3D structure.

The formation of the dielectric layer 414 over the solid-state electrolyte layer 412 may be done using ALD. As mentioned before, the deposition of dielectrics into confined structures is today well-controlled (both in terms of thickness control and conformality) even for extreme aspect ratios (e.g., 1000). For the purpose of illustration, FIG. 5 shows transmission electron microscopy (TEM) images that illustrate the deposition of a SiO/AlO/SiO trilayer into a 3D PAA structure with a pore height of 12 microns and a pore diameter of 80 nanometers. As shown, the deposed trilayer is conformal to an underlying TiN layer all along the pore shape (near the surface, near the middle, and near the bottom) (100% conformality for SiO and >80% conformality for AlO).

In an embodiment, the dielectric layer 414 has a thickness of 5 nanometers or less. As such, the profile of the 3D capacitor is negligibly impacted by the addition of the dielectric layer 414.

In an embodiment, the dielectric layer 414 is made preferably of a paraelectric material. As a paraelectric, the dielectric layer 414 is characterized by a substantially constant permittivity at high frequencies (e.g., >1 kHz) which ensures capacitance stability at the high frequencies. Further, as a paraelectric, the dielectric layer exhibits greater dielectric strength compared to a ferroelectric material, for example, which is advantageous given that one role of the dielectric layer is to prevent breakdown and electronic leakage. In an embodiment, the dielectric layer is made of alumina, silicon oxide, or hafnium oxide.

Figure 4F:
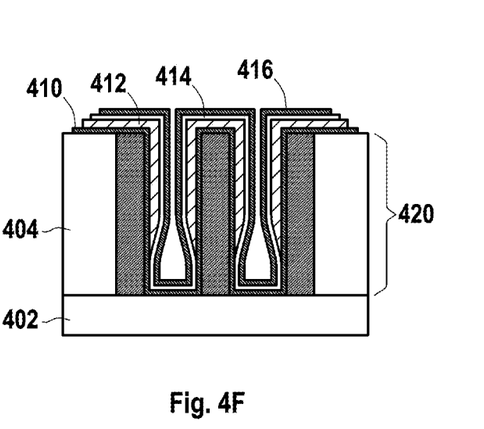

Finally, as shown in FIG. 4F, the process terminates with forming a second electrode layer 416 over the intermediate layer conformal to the intermediate layer. The second electrode layer 410 may include one or more layers of conductive material. In an embodiment, the conductive material is one suitable for ALD deposition. Without limitation, the conductive material may be platinum, ruthenium, molybdenum, cobalt, titanium, titanium nitride, tantalum nitride, $RuO_2$, $Co_3O_4$, $V_2O_5$, $TiO_x$ (x=0.5-2) or $WO_x$ (x=0.5-3). To achieve the required conformality level, ALD with increased exposure time may be used.

According to this embodiment, the first electrode layer may be formed as a bilayer that includes a conductive layer and an oxide layer suitable for ions diffusion/insertion. The oxide layer may also be selected to be suitable for adsorption occurring at the interface between the oxide layer and the conductive layer. The conductive layer may be made of platinum, ruthenium, molybdenum, cobalt, titanium, titanium nitride, tantalum nitride. The oxide layer may be made of $RuO_2$, $Co_3O_4$, $V_2O_5$, $TiO_x$ (x=0.5-2) or $WO_x$ (x=0.5-3). The oxide layer boosts the presence of ionic charges at the interface between the first electrode layer and the solid-state electrolyte, increasing capacitive density.

In another embodiment (not shown in FIGS. 4A-4F), forming the intermediate layer comprises forming another solid-state electrolyte layer over the dielectric layer 414. According to this embodiment, the first electrode layer 408 and the second electrode layer 416 may each be formed as a bilayer that includes a conductive layer and an oxide layer suitable for ions diffusion/insertion. The oxide layer may also be selected to be suitable for adsorption occurring at the interface between the oxide layer and the conductive layer. The oxide layers enhance faradaic reactions at the electrode/electrolyte interfaces (i.e., reactions in which metal elements, e.g., Li, are oxidized to result in metal ions, e.g., Li+) and result in increased charge density at the interfaces.

In another embodiment, the positions of the solid-state electrolyte layer 412 and the dielectric layer 414 are interchanged. As such, forming the intermediate layer comprises forming the dielectric layer 414 over the first electrode layer 410; and forming the solid-state electrolyte layer 412 over the dielectric layer 414.

According to this embodiment, the second electrode layer may be formed as a bilayer that includes a conductive layer and an oxide layer suitable for ions diffusion/insertion. The oxide layer may also be selected to be suitable for adsorption occurring at the interface between the oxide layer and the conductive layer. The conductive layer may be made of platinum, ruthenium, molybdenum, cobalt, titanium, titanium nitride, tantalum nitride. The oxide layer may be made of $RuO_2$, $Co_3O_4$, $V_2O_5$, $TiO_x$ (x=0.5-2) or $WO_x$ (x=0.5-3). The oxide layer boosts the presence of ionic charges at the interface between the second electrode layer and the solid-state electrolyte, increasing capacitive density.

Figure 6A:
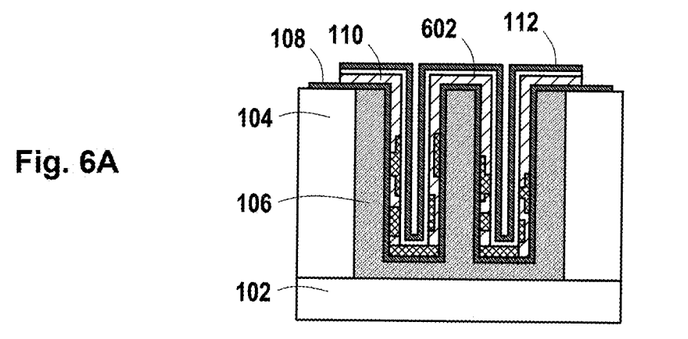
FIGS. 6A to 6C schematically illustrate cross-section views of example 3D solid-state electrolyte capacitors fabricated according to embodiments of the present invention.
Figure 6B:
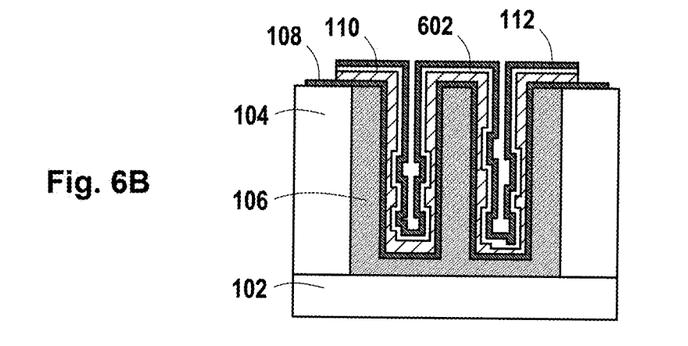
Figure 6C:
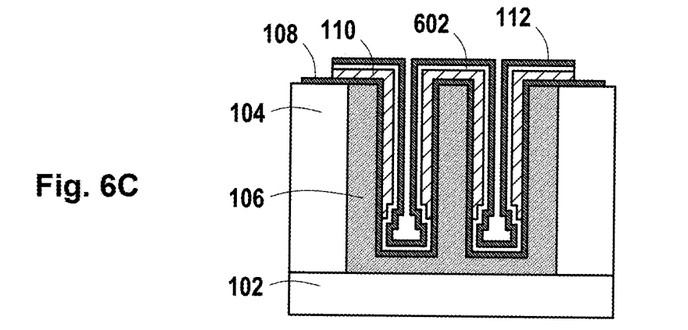

The proposed fabrication method has been shown experimentally to significantly reduce the defects associated with the deposition of solid-state electrolyte in confined structures. FIGS. 6A to 6C schematically illustrate cross-section views of example 3D solid-state electrolyte capacitors fabricated according to embodiments of the present invention. As shown, in one aspect, the interposing of a dielectric layer 602 in a 3D solid-state electrolyte capacitor structure reduces the impact of regions of inhomogeneous composition of the electrolyte (cross-section in FIG. 6A) and regions of inhomogeneous thickness, which regions as discussed above result in weak spots vulnerable to breakdown and electronic leakage in the structure. In another aspect, potential short circuits in the structure due to discontinuities in the electrolyte (cross-section in FIG. 6C) are significantly prevented by the dielectric layer 602 which guarantees separation between the electrodes.

In terms of capacitance performance, the resulting structure provides comparable performance to a conventional solid-state electrolyte capacitor. This is discussed further below with reference to FIGS. 7 and 8.

Figure 7:
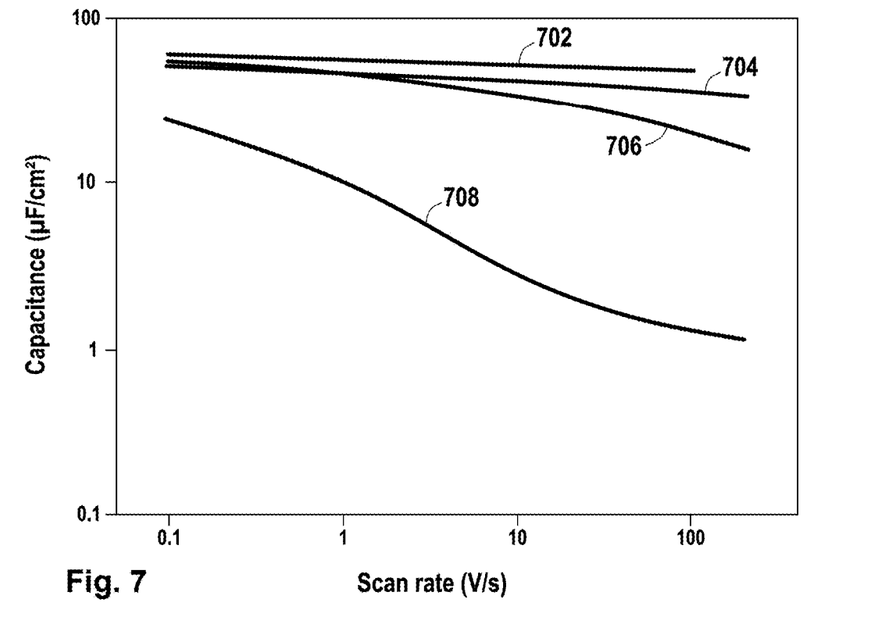
FIG. 7 illustrates the effect of the thickness of the dielectric layer on the capacitance of a 3D solid-state electrolyte capacitor according to an embodiment.

FIG. 7 illustrates the effect of the thickness of the dielectric layer on the capacitance of the solid-state electrolyte capacitor. Specifically, FIG. 7 compares the capacitance density of a conventional solid-state electrolyte capacitor (i.e., without a dielectric layer) and of three solid-state electrolyte capacitors (of different dielectric layer thicknesses) according to the present invention. The solid-state electrolyte capacitors tested had a 2D planar configuration comprising electrode layers made of platinum and an electrolyte layer made of LiPON. The electrode layers had each a thickness of 50 nanometers and the electrolyte layer had a thickness of 100 nanometers. The dielectric layer was made of alumina for the three capacitors according to the present invention and had a thickness of 2, 5, and 10 nanometers respectively. To obtain the plots of FIG. 7, cyclic voltammetry was performed at different scan rates from 100 mV/s to 100 V/s on each capacitor. The capacitance values shown in FIG. 7 were extracted from the cyclic voltammetry plots by integrating the current density over the voltage range.

As shown in FIG. 7, the performance of capacitors according to the present invention are comparable to that of a conventional solid-state electrolyte capacitor (i.e., without a dielectric layer). Indeed, at a thickness of 2 nanometers for the dielectric (plot 704), the difference in capacitance density between a conventional capacitor (plot 702) and the proposed capacitor is very small across the scan rate range. The difference between a thickness of 2 nanometers and a thickness of 5 nanometers (plot 706) is negligible at low scan rates and increases slightly at higher rates. In fact, even at ultra-high scan rates, the capacitance density of a capacitor with a 5 nanometers dielectric remains higher than 10 µF/cm2, a high figure for a 2D planar capacitor. For higher dielectric thickness such as at 10 nanometers (plot 708), the capacitance density is noticeably lower at low scan rates and decreases quickly as the scan rate increases. This implies that there is a limit in terms of thickness of the dielectric at which ions in the solid-state electrolyte no longer move fast enough to store energy even at low rates.

Figure 8:
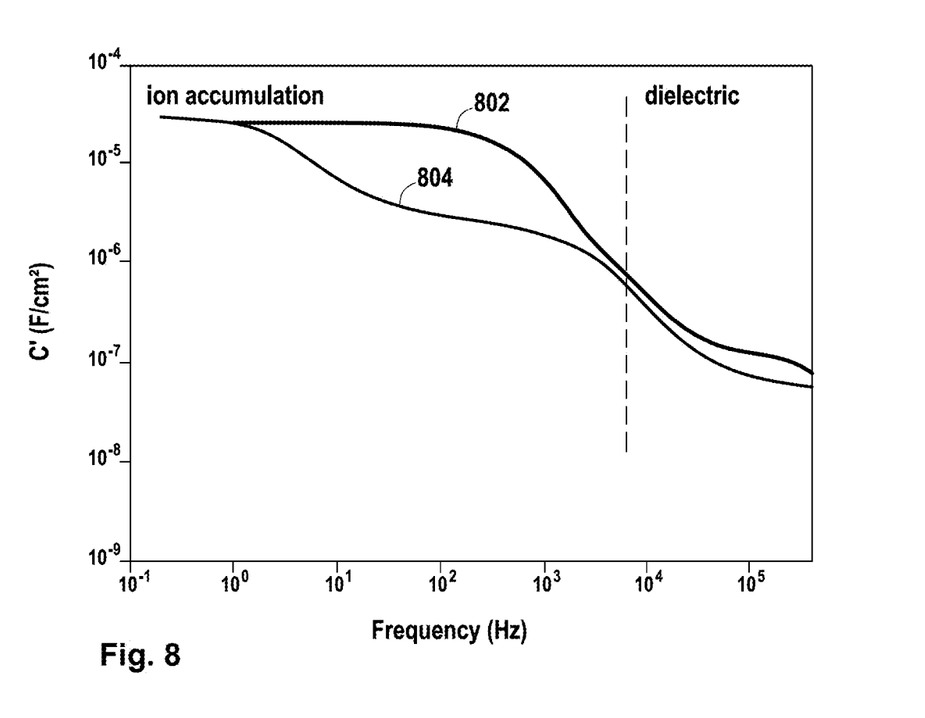
FIG. 8 illustrates the behavior over frequency of the capacitance of a 3D solid-state electrolyte capacitor according to an embodiment.

FIG. 8 illustrates the behavior over frequency of the capacitance of a 3D solid-state electrolyte capacitor according to an embodiment. Specifically, FIG. 8 shows the capacitance versus frequency of a conventional solid-state electrolyte capacitor (plot 802) and of a solid-state electrolyte capacitor with an interposed dielectric layer of 5 nanometers (plot 804). Notably, at lower frequencies (e.g., below 5000 Hz), the performance of the proposed capacitor, while lower than that of the conventional capacitor, remains quite acceptable despite the interposed dielectric layer (which would act as an ion barrier). This is important because ionic capacitors are of most interest at low frequencies, at which their ionic storage mechanism allows for capacitance that is several folds higher (e.g., 200 times higher) than dielectric capacitors. At high frequencies, performance differences between the two structures are negligible as the solid-state electrolyte behaves as a conventional dielectric and the behavior of the solid-state electrolyte/dielectric bilayer is governed by the superposition of the dielectric constants of the electrolyte and dielectric materials.

Additional Variants

Although the present invention has been described above with reference to certain specific embodiments, it will be understood that the invention is not limited by the particularities of the specific embodiments. Numerous variations, modifications and developments may be made in the above-described embodiments within the scope of the appended claims.

The invention claimed is:

1. A method of fabricating a capacitor, comprising:
   forming a three-dimensional structure over a substrate, the three-dimensional structure comprising a region having elongated pores extending towards the substrate from a top surface of the three-dimensional structure remote from the substrate or elongated columns extending away from the substrate towards the top surface of the three-dimensional structure remote from the substrate;
   forming a first electrode layer over a surface of said region of the three-dimensional structure, the first electrode layer conformal to said surface of said region;
   forming an intermediate layer over the first electrode layer; and
   forming a second electrode layer over the intermediate layer, the second electrode layer conformal to the intermediate layer,
   wherein the forming of the intermediate layer comprises:
      forming a solid-state electrolyte layer partially conformal to the first electrode layer; and
      forming a dielectric layer conformal to the first electrode layer.

2. The method of claim 1, wherein the solid-state electrolyte layer has a conformality to the first electrode layer greater than 50% and lower than 80% and the dielectric layer has a conformality to the first electrode layer greater than or equal to 80%.

3. The method of claim 1, further comprising:
   not verifying the conformality of the solid-state electrolyte layer during fabrication of the capacitor.

4. The method of claim 1, further comprising:
   forming the solid-state electrolyte layer over the first electrode layer; and
   forming the dielectric layer over the solid-state electrolyte layer.

5. The method of claim 4, wherein the first electrode layer includes an oxide layer suitable for ions diffusion/insertion.

6. The method of claim 5, wherein the first electrode layer includes a conductive layer, the oxide layer suitable for adsorption occurring at an interface between the oxide layer and the conductive layer.

7. The method of claim 4, wherein forming the intermediate layer comprises forming another solid-state electrolyte layer over the dielectric layer.

8. The method of claim 7, wherein the first electrode layer and the second electrode layer each includes a conductive layer and an oxide layer suitable for ions diffusion/insertion and suitable for adsorption occurring at an interface between the oxide layer and the conductive layer.

9. The method of claim 1, further comprising:
   forming the dielectric layer over the first electrode layer; and
   forming the solid-state electrolyte layer over the dielectric layer.

10. The method of claim 9, wherein the second electrode layer includes an oxide layer suitable for ions diffusion/insertion.

11. The method of claim 10, wherein the second electrode layer includes a conductive layer, the oxide layer suitable for adsorption occurring at an interface between the oxide layer and the conductive layer.

12. The method of claim 1, wherein the dielectric layer has a thickness of 5 nanometers or less.

13. A capacitor, comprising:
    a substrate;
    a three-dimensional structure disposed over the substrate, the three-dimensional structure comprising a region having elongated pores extending towards the substrate from a top surface of the three-dimensional structure remote from the substrate or elongated columns extending away from the substrate towards the top surface of the three-dimensional structure remote from the substrate;
    a first electrode layer disposed over a surface of said region of the three-dimensional structure, conformal to said surface of said region;
    an intermediate layer disposed over the first electrode layer, conformal to the first electrode layer; and
    a second electrode layer disposed over the intermediate layer, conformal to the intermediate layer,
    wherein the intermediate layer comprises:
       a solid-state electrolyte layer partially conformal to the first electrode layer; and
       a dielectric layer conformal to the first electrode layer.

* * * * *